United States Patent
Huck et al.

(10) Patent No.: US 12,044,549 B2
(45) Date of Patent: Jul. 23, 2024

(54) OPTICAL READING DEVICE FOR A POINTER INSTRUMENT

(71) Applicant: Siemens Aktiengesellschaft, Munich (DE)

(72) Inventors: Ralf Huck, Großkrotzenburg (DE); Stefan Klehr, Rheinzabern (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 165 days.

(21) Appl. No.: 17/611,810

(22) PCT Filed: May 19, 2020

(86) PCT No.: PCT/EP2020/063975
§ 371 (c)(1),
(2) Date: Nov. 16, 2021

(87) PCT Pub. No.: WO2020/234302
PCT Pub. Date: Nov. 26, 2020

(65) Prior Publication Data
US 2022/0236088 A1    Jul. 28, 2022

(30) Foreign Application Priority Data
May 20, 2019 (DE) .......................... 102019207322.0

(51) Int. Cl.
*G01D 13/04* (2006.01)
*G01D 13/22* (2006.01)
(Continued)

(52) U.S. Cl.
CPC ............. *G01D 13/04* (2013.01); *G01D 13/22* (2013.01); *G01D 13/26* (2013.01); *G01L 19/083* (2013.01); *G01L 19/12* (2013.01); *G01L 19/16* (2013.01)

(58) Field of Classification Search
CPC ........ G01D 13/04; G01D 13/22; G01D 13/26; G01L 19/16; G01L 19/083; G01L 19/12
See application file for complete search history.

(56) References Cited

U.S. PATENT DOCUMENTS

D16,045 S   *   4/1885   Kling ........................... D10/126
2,188,872 A *   1/1940   Carlson ................. G04B 19/00
                                                        368/232
(Continued)

FOREIGN PATENT DOCUMENTS

CN        2098007 U       3/1992
CN        101116118       1/2008
(Continued)

OTHER PUBLICATIONS

JP-2003106874-A, Sakuma Tadashi, "Display Device", Apr. 2003 (Year: 2003).*

(Continued)

*Primary Examiner* — John Fitzgerald
*Assistant Examiner* — Tania Courson
(74) *Attorney, Agent, or Firm* — Cozen O'Connor

(57) ABSTRACT

An optical reading device for a pointer instrument which has a pointer and a scale face or dial with different degrees of reflectance in each case, includes an illumination device for illuminating the scale face or dial and a plurality of light sensor elements which are arranged in a circular arc about the rotational axis of the pointer in order to detect the light of the illumination device reflected back by the scale face or dial, wherein the illumination device is configured to uniformly illuminate the scale face or dial and each light sensor element is configured with an isosceles triangle outline, where each light sensor element is offset with respect to one another by half of the base width in the circumferential direction of the circular arc.

8 Claims, 3 Drawing Sheets

(51) Int. Cl.
*G01D 13/26* (2006.01)
*G01L 19/08* (2006.01)
*G01L 19/12* (2006.01)
*G01L 19/16* (2006.01)

(56) References Cited

U.S. PATENT DOCUMENTS

| | | | | |
|---|---|---|---|---|
| 3,482,106 | A * | 12/1969 | Anderegg, Jr. | G01D 5/38 250/210 |
| 3,823,549 | A * | 7/1974 | Feldman | G04G 5/045 968/950 |
| 4,213,294 | A * | 7/1980 | Freeman | G04G 9/062 368/242 |
| 4,275,393 | A | 6/1981 | Johnston | |
| 4,370,068 | A * | 1/1983 | Han | G04G 9/02 368/240 |
| 4,497,312 | A * | 2/1985 | Byrd | G04B 47/00 968/398 |
| 4,553,851 | A * | 11/1985 | Matsumoto | G04C 10/02 368/203 |
| 5,010,533 | A * | 4/1991 | Blackburn | G04B 19/10 368/232 |
| 5,580,156 | A * | 12/1996 | Suzuki | F21V 31/03 116/63 P |
| 5,586,089 | A * | 12/1996 | McGarvey | G04B 45/0007 368/233 |
| 5,949,346 | A | 9/1999 | Suzuki et al. | |
| 6,157,311 | A | 12/2000 | Berkovich | |
| 6,690,623 | B1 * | 2/2004 | Maano | G04G 9/04 368/84 |
| 6,745,506 | B2 * | 6/2004 | Maas | G02B 6/0036 362/604 |
| 7,171,105 | B2 * | 1/2007 | Winkler | G02B 6/006 362/610 |
| 7,193,729 | B1 * | 3/2007 | Li | G01D 13/22 345/55 |
| 7,370,603 | B2 * | 5/2008 | Balsfulland | G01D 13/265 116/48 |
| 7,376,238 | B1 * | 5/2008 | Rivas | A61B 5/0205 381/381 |
| 7,377,184 | B1 | 5/2008 | Schlachter | |
| 7,455,441 | B2 * | 11/2008 | Chosa | G02B 6/0031 349/98 |
| 7,492,520 | B2 * | 2/2009 | Yokota | G02B 6/0053 359/599 |
| 7,773,464 | B2 * | 8/2010 | Rogers | G04F 1/005 368/240 |
| 7,872,950 | B1 * | 1/2011 | Su | G04C 17/02 368/76 |
| 8,065,973 | B2 * | 11/2011 | Suzuki | G01D 11/28 428/167 |
| 8,164,985 | B2 * | 4/2012 | Su | G04G 9/042 368/240 |
| 8,221,125 | B2 * | 7/2012 | Darling | G09B 29/005 368/21 |
| 8,325,050 | B1 | 12/2012 | Schlachter | |
| 8,809,763 | B1 | 8/2014 | Stutz | |
| 8,897,101 | B2 * | 11/2014 | Kawakami | G04B 19/06 368/205 |
| 9,588,348 | B2 * | 3/2017 | Park | H04N 13/305 |
| 9,908,413 | B2 * | 3/2018 | Terashima | G02B 27/024 |
| 10,192,522 | B2 * | 1/2019 | Fujita | G09G 3/001 |
| 11,061,371 | B1 * | 7/2021 | Oberson | G04B 45/0015 |
| 11,117,468 | B2 * | 9/2021 | Fujita | G01D 13/22 |
| 11,214,147 | B2 * | 1/2022 | Zimmermann | B60Q 3/64 |
| 2004/0145971 | A1 * | 7/2004 | Lau | G04B 45/0015 368/84 |
| 2006/0083476 | A1 * | 4/2006 | Winkler | G02B 6/0021 385/146 |
| 2007/0070822 | A1 * | 3/2007 | Booty | G04G 9/02 368/223 |
| 2007/0147181 | A1 * | 6/2007 | Piccirillo | G04G 9/042 368/223 |
| 2007/0291368 | A1 * | 12/2007 | Yokota | G02B 6/0053 359/613 |
| 2008/0048879 | A1 | 2/2008 | Lipman | |
| 2008/0232135 | A1 * | 9/2008 | Kinder | G02B 6/0053 385/146 |
| 2009/0009687 | A1 * | 1/2009 | Park | G02B 5/0242 362/558 |
| 2010/0023219 | A1 | 1/2010 | Müller et al. | |
| 2010/0039904 | A1 * | 2/2010 | Rogers | G04G 9/02 368/110 |
| 2010/0278480 | A1 * | 11/2010 | Vasylyev | G02B 6/0055 385/36 |
| 2012/0140604 | A1 * | 6/2012 | Kawakami | G04B 19/10 368/276 |
| 2012/0188792 | A1 * | 7/2012 | Matsumoto | G02B 6/0036 362/621 |
| 2013/0044573 | A1 * | 2/2013 | Takasawa | G04D 3/0092 29/896.3 |
| 2014/0239151 | A1 | 8/2014 | Schumacher | |
| 2016/0204292 | A1 | 7/2016 | Saito | |
| 2017/0072800 | A1 * | 3/2017 | Fujita | G09F 13/00 |

FOREIGN PATENT DOCUMENTS

| | | |
|---|---|---|
| CN | 101506622 | 8/2009 |
| CN | 103234593 | 8/2013 |
| CN | 104006835 | 8/2014 |
| CN | 203848858 U | 9/2014 |
| CN | 105531633 | 4/2016 |
| CN | 108645490 | 10/2018 |
| DE | 3142098 | 5/1983 |
| EP | 0078372 | 5/1983 |
| EP | 2905595 | 8/2015 |
| JP | H05-030995 U | 4/1993 |
| JP | H09-152360 | 6/1997 |
| JP | H09318393 | 12/1997 |
| JP | 2002-257597 | 9/2002 |
| JP | 2003-130693 | 5/2003 |
| JP | 2004-354072 | 12/2004 |
| JP | 2006-017587 | 1/2006 |
| JP | 2009-258017 | 11/2009 |
| RU | 2390740 C1 | 5/2010 |
| WO | 2007147609 | 12/2007 |

OTHER PUBLICATIONS

JP-2001141527-A, Inagaki et al., "Lighting System for Dial of Meter for Vehicle", May 2001. (Year: 2001).*
PCT International Search Report dated Sep. 11, 2020 based on PCT/EP2020/063975 filed May 19, 2020.
Guan et al. "Engineering Study for pointer instrument design", (3 pages), May 15, 1999.
Tang et al. "A new calibration method for water meters based on machine vision technology", ACTA, Etrologica Sinica, vol. 36, No. 1, pp. 54-57, Jan. 22, 2015.

* cited by examiner

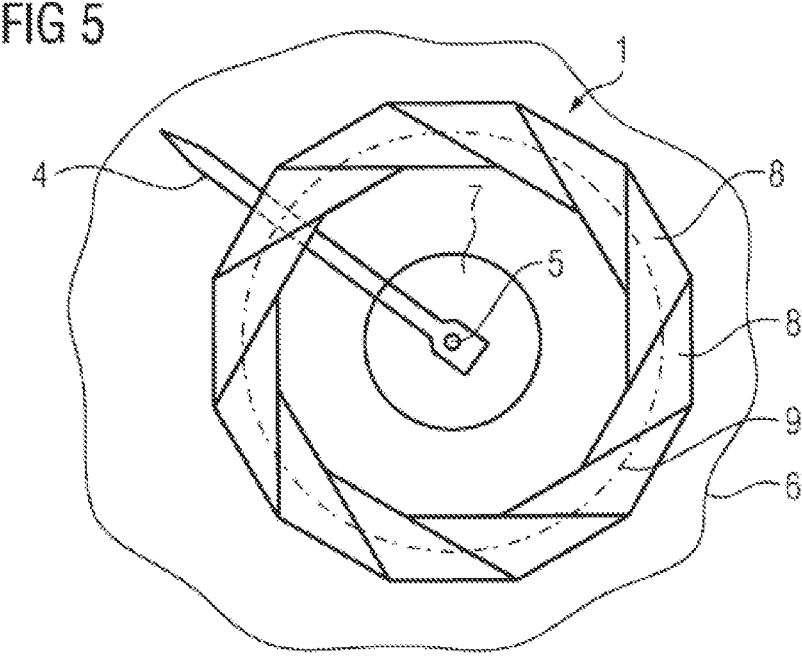
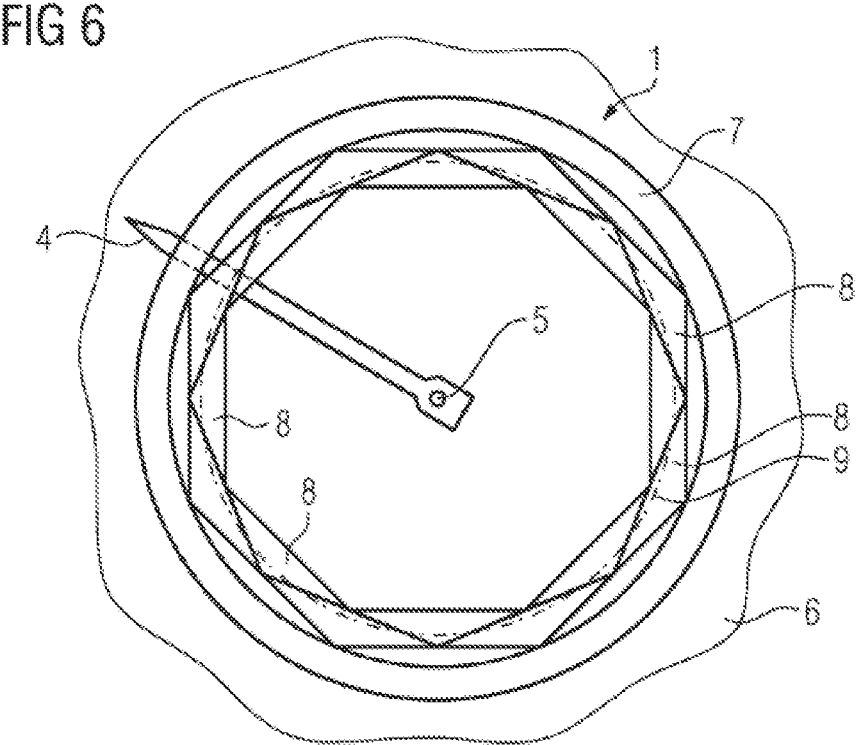

OPTICAL READING DEVICE FOR A POINTER INSTRUMENT

CROSS-REFERENCE TO RELATED APPLICATIONS

This is a U.S. national stage of application No. PCT/EP2020/063975 filed 19 May 2020. Priority is claimed on German Application No. 10 2019 207 322.0 filed 20 May 2019, the content of which is incorporated herein by reference in its entirety.

BACKGROUND OF THE INVENTION

1. Field of the Invention

The invention relates to an optical reading device for a pointer instrument.

2. Description of the Related Art

WO 2007/147609 A2 discloses a conventional reading device for a pointer instrument.

Pointer instruments, such as manometers or thermometers, which are already installed in the field, are usually read on site by a person. There is a need to read these pointer instruments remotely without a person having to be on site. In addition, the reading of the measurement variable indicated by the pointer position should occur automatically and should be made available as a measurement value in digital form.

There is often no electrical energy supply and no data line available on site. A technical device that reads the pointer position automatically should therefore use as little energy as possible and should be able to transfer the measurement value wirelessly. In addition, this technical device should have only a small cost so that a retrofit of this type is worthwhile for the operator.

As described in EP 2 905 595 A1, it is known to photograph the pointer instrument with a digital camera and to display it on a remote monitor or to determine the displayed measurement value automatically by means of digital image processing.

As stated, WO 2007/147609 A2 describes a conventional monitoring device for a pointer instrument having a pointer and a scale face or dial with different reflection properties. The monitoring device comprises at least one capturing device with a light source and a sensor that is fastened to the measuring device and detects, in the manner of a reflection-type light barrier, when the pointer has reached a predetermined position and thereby interrupts the light reflected back from the scale face or dial in the direction toward the sensor. The light source and the sensor can be fastened beside one another on the glass cover of the pointer instrument. A plurality of capturing devices (reflection-type light barriers) can be arranged in an annular manner about the rotation axis of the pointer such that, in this way, the position of the pointer relative to the measurement value scale can be captured in segments. Therein, the segments can have the same or different angular extents. The device for fastening the monitoring device to the pointer instrument can be made at least partially from a transparent material, such as acrylic glass, so that regions of the measurement value scale or the pointer remain visible. The fastening can take place by means of screws, a snap mechanism or with adhesive strips.

U.S. Pat. Nos. 6,157,311 A and 4,275,393 A disclose further optical reading devices for an analogous pointer instrument, in which the pointer instrument is illuminated and, via a light sensor, a pointer position and/or an exceeding of the pointer position is detected. In the reading devices described by U.S. Pat. No. 8,325,050 B1 and U.S. Pat. No. 7,377,184 B1, in the same way, the movement of a triangular marking on the pointer base and/or the movement of a star-shaped inlet rotor of a water meter is detected.

It is an object of the invention to capture a continuous analogue pointer position in a simple manner.

This and other objects and advantages are achieved in accordance with the invention by a optical reading device for a pointer instrument which has a pointer and a scale face or dial, each with different reflectances, which comprises an illumination apparatus for illuminating the scale face or dial and a plurality of light sensor elements that are arranged in a circular arc about the rotation axis of the pointer for capturing the light of the illumination apparatus reflected back by the scale face or dial, where the illumination apparatus is configured to evenly illuminate the scale face or dial at least in the region opposite the circular arc and where the light sensor elements are each configured with an isosceles triangular outline and, in the circumferential direction of the circular arc, are each arranged offset from one another by half of the base width.

The angular region of the circular arc in which the light sensor elements are arranged about the rotation axis of the pointer should correspond to at least the deflection range of the pointer of the pointer instrument. In order to be able to use the optical reading device largely independently of the construction of the pointer instrument, the light sensor elements can be arranged in a closed circle.

The triangular light sensor elements are each arranged offset from one another in the circumferential direction of the circular ring by half of the triangle width, in each position. As a result, the pointer shades at least two adjacent light sensor elements simultaneously. Consequently, each analogue pointer position can be clearly identified from the degree of shading of the affected light sensor elements. As distinct from a digital camera or a CCD sensor, the reading device in accordance with the invention manages with relatively few light sensor elements, which are significantly more economical and require much less energy. As a result, an economical high-resolution optical reading device is obtained which can be mounted on any pointer instruments and, due to its low energy consumption, can be supplied with energy from a battery or the environment (energy harvesting).

The triangular light sensor elements can be differently arranged in a circular or circular arc form, where each light sensor element abuts, with the limbs of its triangular outline, a limb or the base side of an adjacent light sensor element.

Therein, the light sensor elements can each be configured in the form of a triangular optical waveguide made of transparent material with a relatively large refractive index, which conducts light falling within the triangular outline onto a photosensor, such as a photodiode.

For daytime-independent illumination of the scale face or dial of the pointer instrument, the illumination apparatus can contain a light source, for example, an LED that emits either in the visible or the non-visible spectrum (e.g., the infrared). The photodiodes of the light sensor elements are advantageously selected to be suited to the spectrum of the light source. The light source is switched on only briefly when needed, in order to perform a measurement of the pointer position.

The aforementioned photodiodes and the LED are economical standard parts and the triangular optical waveguides can also be made as simple injection molded parts from transparent plastics.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described using exemplary embodiments and making reference to the drawings, in which:

FIG. 5 is a second exemplary embodiment of the optical reading device in accordance with the invention; and FIG. 6 is a third exemplary embodiment of the optical reading device in accordance with the invention.

DETAILED DESCRIPTION OF THE EXEMPLARY EMBODIMENTS

The same reference signs have the same meaning in the different figures. The illustrations are purely schematic and do not represent any size relationships.

Figure 1:
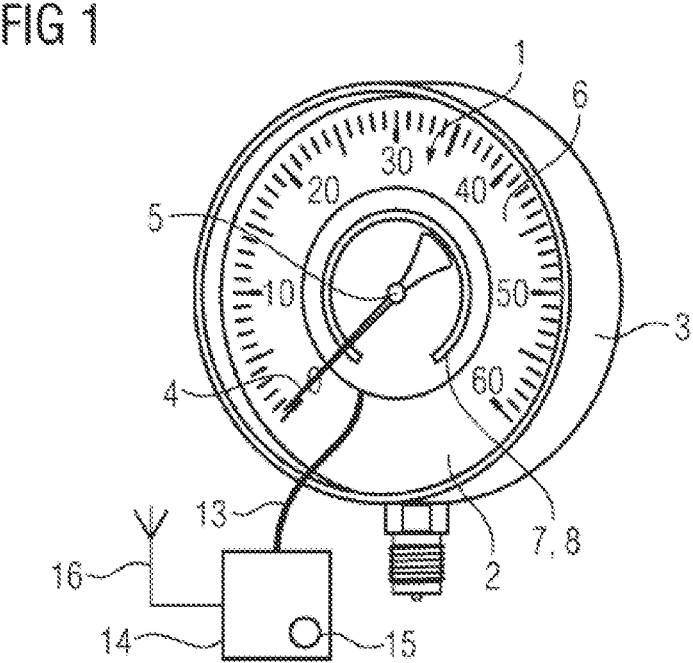
FIG. 1 is an exemplary embodiment of an optical reading device on a pointer instrument in accordance with the invention.

FIG. 1 shows, by way of example, an exemplary embodiment of an optical reading device 1 in the form of a flat pick-up sensor that is cemented onto the front glass 2 of a pointer instrument 3, in this case a manometer. The reading device 1 can also be differently mounted, for example, cemented onto the pointer instrument 3. The pointer instrument 3 is a commonplace circular instrument with a pointer 4 that rotates about an axis 5 and stands out with high contrast from the scale face or dial 6 of the pointer instrument 3. In the illustrated example, the scale face or dial 6 is light, in particular, white and the pointer is dark, for example, black. Naturally, conversely, the pointer 4 can be light and the scale face 6 can be dark.

The reading device (pick-up sensor) 1 is arranged and configured such that, firstly, it lies opposite the pointer 4 so that it captures the deflection range of the pointer fully and, secondly, further enables a view of the scale labelling and, at least partially, the pointer 4. In particular, the reading device 1 can be configured transparent in large parts.

Figure 2:
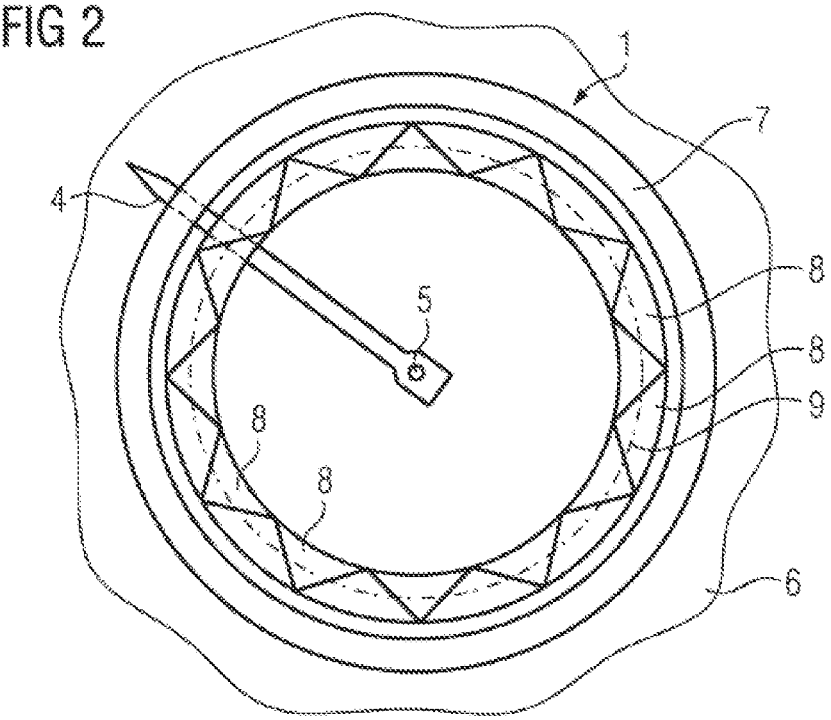
FIG. 2 is a first exemplary embodiment of the optical reading device in accordance with the invention.

As shown in FIG. 2 in greater detail, the reading device 1 has an illumination apparatus 7 for illuminating the scale face or dial 6 and a plurality of light sensor elements 8 that are arranged in a circle 9 round the rotation axis 5 of the pointer 4. Here, the illumination apparatus 7 is configured annular and concentric with the circle 9 having the light sensor elements 8. The scale face or dial 6 is evenly illuminated at least in the region opposite the circle 9 with the light sensor elements 8 by the light of the illumination apparatus 7, where the light reflected back by the scale face or dial 6 is captured by the light sensor elements 8. At the site where the pointer 4 is currently situated, the light sensor elements 8 are shaded and receive less light.

Figure 3:
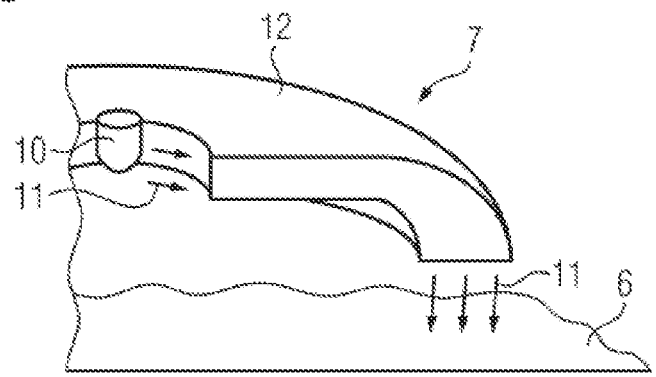
FIG. 3 is an exemplary embodiment of an illumination apparatus in accordance with the invention.

FIG. 3 shows, by way of example, a portion of the illumination apparatus 7 with a light source 10, for example, a light-emitting diode, the light 11 of which is conducted centrally into a circular transparent window 12. The outer edge of the transparent window 12 is bent over toward the scale face or dial 6, so that the light 11 distributed in the window 12 is decoupled evenly there onto the scale face or dial 6 and illuminates it in an annular manner. In place of or in addition to the active light source 10, a passive light collecting element (not shown here) of the same transparent material as the window 12 can be provided that collects ambient light and conducts it into the window 12.

Returning to FIG. 1, the reading device (pickup sensor) 1 is connected via a line 13 to an evaluating apparatus 14 that supplies the light source 10 with electric current and evaluates electric signals generated by the light sensor elements 8 to ascertain the position of the pointer 4. As shown in FIG. 1, the circle 9 with the light sensor elements 8 must not necessarily be closed if the deflection range of the pointer 4 is less than 360°, in this case, for example, 270°. The evaluating apparatus 14 can have, for example, an ambient light sensor 15 and can be configured to switch on the light source 10 only if ambient light is lacking or insufficient. The evaluating apparatus 14 can have a battery or solar cell for the power supply, a microcontroller for determining the pointer position and a radio interface 16, such as Bluetooth for transferring the pointer position determined to a higher-level site.

As shown in FIG. 2, the light sensor elements 8 (relative to the plane of the scale face or dial 6) are substantially configured as isosceles triangles and thereby are arranged offset from one another in the circumferential direction of the circle 9 by a half triangle width and therein alternately each rotated by 180°. In other words, the triangular light sensor elements 8 each abut, with each of their two limbs, one limb of each of the two adjacent triangular light sensor elements 8 to the right and the left. It is achieved in this way that the pointer 4 always shades at least two adjacent light sensor elements 8 simultaneously, where, each analogous pointer position can be unambiguously identified via the evaluating apparatus 14 using the difference or the relationship of the shadings of the light sensor elements 8 affected. If the pointer 4 lies exactly opposite the center of the triangle of a light sensor element 8, then the shading of the element 8 is a maximum in relation to the triangular surface, whereas the shading of each of the adjacent light sensor elements 8 to the right and the left is a minimum. If the pointer 4 moves, for example, to the right (clockwise), the (relative) shading of the previously still maximally shaded light sensor element 8 decreases, whereas the shading of the adjacent light sensor element 8 to the right increases.

In the example given, the base sides of the triangle are formed by circular arcs so that the light sensor elements 8 together form an annulus (or annular arc). Alternatively, the base sides can be straight so that the light sensor elements 8 together form a polygonal ring.

Figure 4:
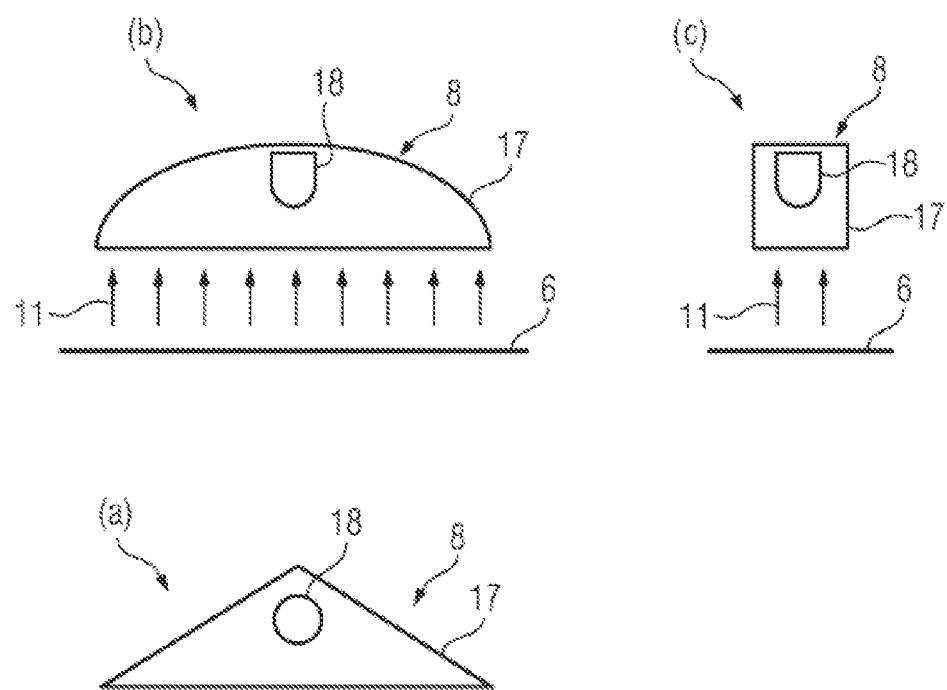
FIG. 4 is an exemplary embodiment of a light sensor element in accordance with the invention.

FIG. 4 shows an example of one of the light sensor elements 8 in plan view (a) according to the view perpendicular to the scale face or dial 6, with a view onto the broad side of the triangle (b) and in a side view (c). The light sensor element 8 consists of a triangular optical waveguide 17 made of transparent plastics with a relatively large optical refractive index, for example, cyclic olefin copolymer (COC) polymer with an embedded photosensor 18, e.g., a photodiode. The optical waveguide 17 conducts the light 11 reflected from the scale face or dial 6 from the underside to the photodiode 18. The triangular-shaped optical waveguides 17 can be produced as individual components that are subsequently joined to the annulus or polygonal ring. Alternatively, an annular or polygonal ring-shaped optical waveguide can be produced integrally from the transparent plastics in that subsequently, the individual triangular optical waveguides 17 are subsequently formed by introducing separating structures (channels, or grooves).

FIG. 5 shows a further exemplary embodiment of the optical reading device 1 that differs from that in FIG. 2 by having the triangular light sensor elements 8 each abut the base of an adjacent triangular light sensor element 8 with one limb.

The illumination apparatus 7 is herein not configured and arranged as an outer illuminating ring, but as a central illumination source.

FIG. 6 shows a third exemplary embodiment of the optical reading device 1 in which each second triangular light sensor element 8 abuts with both its limbs the base sides of the two adjacent triangular light sensor elements 8 to the left and to the right.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An optical reading device of a pointer instrument having a pointer and a scale face or dial with different reflection properties, comprising:
    an illumination apparatus for illuminating the scale face or dial of the pointer instrument; and
    a plurality of triangular light sensor elements which are arranged in a circle about a rotation axis of the pointer for capturing light of the illumination apparatus reflected back by the scale face or dial of the pointer instrument;
    wherein the illumination apparatus is configured to evenly illuminate the scale face or dial at least in a region opposite the circle; and
    wherein the plurality of triangular light sensor elements each substantially formed as isosceles triangles and are each arranged adjacent to one another along a circumferential direction of the circle.

2. The optical reading device as claimed in claim 1, wherein the plurality of light sensor elements are each arranged rotated by 180°.

3. The optical reading device as claimed in claim 1, wherein the plurality of light sensor elements each abut a side of a triangular outline of an adjacent light sensor element with one limb of their triangular outline.

4. The optical reading device as claimed in claim 1, wherein each second triangular light sensor element of the plurality of triangular light sensor elements abuts with both limbs of a triangular outline of each triangular light sensor element on sides of an adjacent triangular light sensor of the plurality of triangular light sensor elements on both sides.

5. The optical reading device as claimed in claim 1, wherein the plurality of light sensor elements each comprise a triangular optical waveguide made of transparent material and a photosensor.

6. The optical reading device as claimed in claim 1, wherein the illumination apparatus is further configured for receiving and distributing ambient light onto the region to be illuminated.

7. The optical reading device as claimed in claim 6, wherein the illumination apparatus contains a light source.

8. An optical reading device of a pointer instrument having a pointer and a scale face or dial with different reflection properties, comprising:
    an illumination apparatus for illuminating the scale face or dial of the pointer instrument; and
    a plurality of triangular light sensor elements which are arranged in a circle about a rotation axis of the pointer for capturing light of the illumination apparatus reflected back by the scale face or dial of the pointer instrument;
    wherein the illumination apparatus is configured to evenly illuminate the scale face or dial at least in a region opposite the circle;
    wherein the plurality of triangular light sensor elements each substantially formed as isosceles triangles and are each arranged adjacent to one another along a circumferential direction of the circle; and
    wherein each light sensor element of the plurality of light sensor elements abuts, via limbs of a triangular outline of the light sensor element, another limb or base side of an adjacent light sensor element.

* * * * *